Dec. 29, 1931.  J. A. BODES  1,838,610
MILK COOLER
Filed Nov. 16, 1927
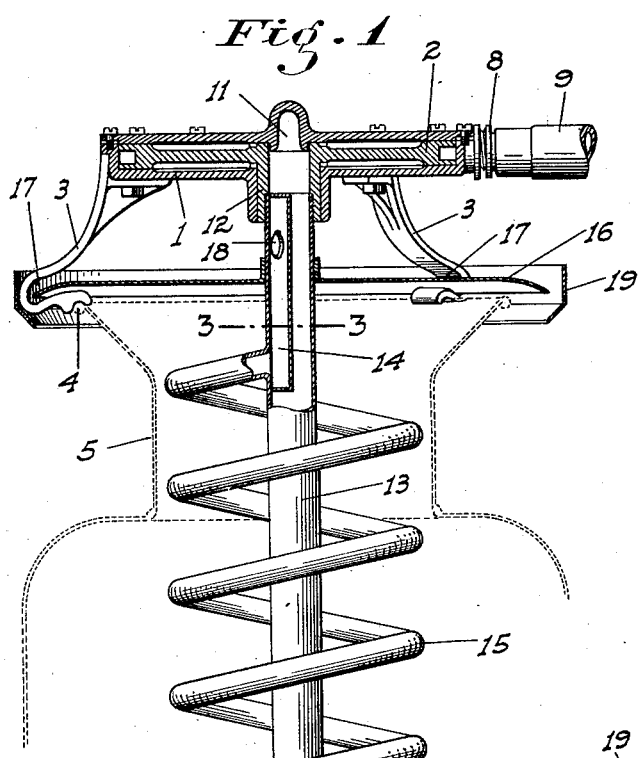
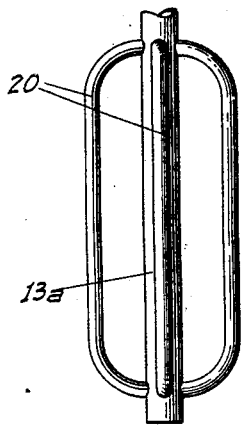
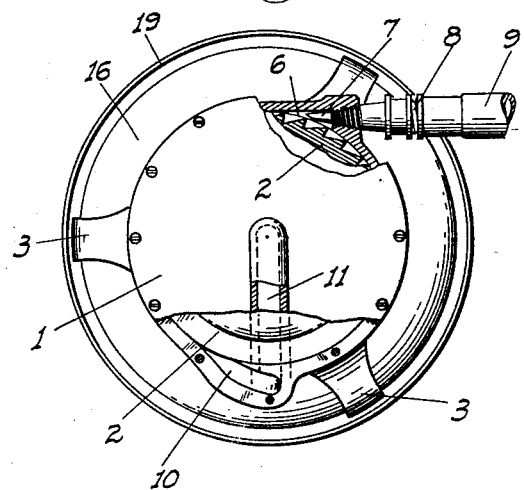
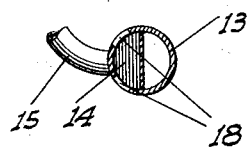
INVENTOR
J. A. Bodes
BY
ATTORNEY Patented Dec. 29, 1931

1,838,610

UNITED STATES PATENT OFFICE

JOHN A. BODES, OF MODESTO, CALIFORNIA

MILK COOLER

Application filed November 16, 1927. Serial No. 233,598.

This invention relates to improvements in devices for cooling milk in the cans in which the milk is placed prior to shipment from the dairy, and is a continuation in part of my application Serial No. 209,291, filed July 29, 1927.

The principal object of my invention is to provide a device which may be detachably engaged with the can, by means of which a supply of cooling water will be caused to circulate through passage members depending into the can but of course shut off from the milk; while at the same time causing the flowing water itself to rotate the passage members. Not only therefore is the cooling effect of the water imparted to the milk but the milk itself is agitated, which causes the heat therein to be moved to the top of the milk and carried off more quickly than would be otherwise the case. This agitation also causes a greater proportion of the volume of the milk to be moved to contact with the passage members than is the case when said members are stationary.

The water after passing through the cooling members is discharged over the sides of the can, further aiding in cooling the contents thereof. As a result with the use of my improved cooler the entire contents of a standard milk can will be adequately cooled in about ten minutes time.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional elevation of my improved cooling device as applied to a milk can.

Fig. 2 is a top plan view of the same partly broken out.

Fig. 3 is a fragmentary cross-section on line 3—3 of Fig. 1.

Fig. 4 is a side elevation of a modified form of rotating or agitating passage member unit.

Referring now more particularly to the characters of reference on the drawings, and particularly at present to Figs. 1 to 3, 1 denotes a horizontal housing in which is mounted a water wheel 2 of suitable design. Depending from this housing are feet or brackets 3 which are adapted to rest on the rim 4 of the neck 5 of a standard milk can in such a manner as to centralize the housing relative to the can. The intake 6 to the side of the housing has a nozzle 7 projecting therein with a coupling 8 on its outer end for connection to an ordinary water hose 9. The discharge opening 10 from the wheel housing connects with a passage 11 which leads back to the interior of the housing over the hub 12 of the wheel, which hub is of hollow or tubular form. Secured onto the hub and depending thence through the pan and into the milk can a certain distance is a tube 13, closed on the bottom. Adjacent one end the tube is formed with an interior chamber 14 disposed to one side of the tube and separated from the remainder thereof. A tube-coil 15 surrounds the tube 13 in spaced relation thereto, this coil extending for practically the full height of the tube being connected at its lower end to the tube and at its upper end to the chamber 14. The turns of the coil are widely spaced and the diameter of the coil is such that it will readily fit through the neck of the can.

Secured on to the tube is a plate 16 which passes adjacent its outer periphery through horizontal slots 17 formed in the feet 3 so as to enable said plate to be of greater diameter than the rim of the can and to overhang the same. Discharge openings 18 from the chamber 14 above the connection of the coil therewith are located above the plate so as to discharge thereon. At its rim the plate is curved downwardly somewhat and a deflecting or baffle ring 19 is secured to the feet and extends around the rim of the plate and can in spaced relation thereto and above and below the same.

In operation with the device resting on the can, water discharged under normal city or similar pressure into the nozzle 7 will of course cause the water wheel 2 to be rapidly rotated. This of course causes the tube and coil to be rotated likewise and these members, depending into the milk, agitate the same and tend to cause the heat in the milk to rise to the surface. The water after actuating the wheel passes into the tube through the passage 11 and descends to the bottom of the tube. The water confined in the tube being thrown centrifugally with the rotation of said tube will enter the bottom of the coil and will travel to the top. Such water will then enter the chamber 14 and being still acted upon centrifugally will be discharged through the openings 18 onto the plate 16. From the pan the water drains from around the rim of the plate onto the sides of the can, being prevented from being thrown farther out by the baffle ring. The continuously flowing water passing through all the parts of the revolving agitator, of course quickly cools the milk. The agitation of the water passage member not only causes the heat in the milk to rise to the surface, as above stated, but causes the cooled surfaces of the tube and coil to come in contact with a much greater percentage of the volume of the milk than would be the case if such members were stationary in the can.

While the coil type of water circulator and agitator is preferred, I may if desired arrange the agitator in the form shown in Fig. 4. In this form I provide a number of relatively small tubes 20 disposed in parallel but spaced relation to the tube 13a outwardly of the same, said tubes at the top and bottom being individually connected to said main tube 13a.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A milk-can cooler including a water circulation passage member to depend into a can, means for supporting said member from the can, means for passing water through the member, means actuated by the water flowing toward and prior to reaching said member for rotating the same, a plate below said water actuated means secured to and surrounding the member, said plate being adapted to extend outwardly of the neck of a can, and a discharge outlet from the passage member above the plate.

2. A milk-can cooler including a tube closed on the bottom and adapted to depend into a can, a passage member projecting outwardly from said tube and communicating at both ends therewith, a water wheel secured to the top of the tube, means for supplying water to the wheel to rotate the same, means causing the water after rotating the wheel to be discharged into the tube so as to cause such water to circulate downwardly through the tube and then upwardly through the passage member, a discharge outlet for the upper end of said passage member and a plate fixed on the tube below the outlet and of a size to project outwardly of the rim of a can.

3. A milk-can cooler including a water circulation passage member adapted to depend into a milk can, a circular plate fixed with the member and overhanging the rim of the can, means supporting said member and plate in suspended relation to the can, means for supplying water to the upper end of the passage member above the plate, said member having an outlet discharging onto the plate, means for rotating the member and plate as a unit, whereby the water from the outlet is thrown centrifugally to the rim of the plate, and a baffle ring positioned outwardly of the plate to catch the water thus thrown and deflect it downwardly against the can.

4. A milk-can cooler including a horizontal water wheel having a hollow central hub, a casing enclosing and supporting the wheel and forming a bearing for the hub, a water passage member secured to and depending from the hub to project into the can, a water supply nozzle connected to the casing at one edge, and a discharge passage in the casing leading from the periphery thereof opposite to the nozzle to the hollow hub.

In testimony whereof I affix my signature.

JOHN A. BODES.